W. J. GROTENHUIS.
BUMPER BRACKET.
APPLICATION FILED NOV. 9, 1921.
1,424,400.
Patented Aug. 1, 1922.
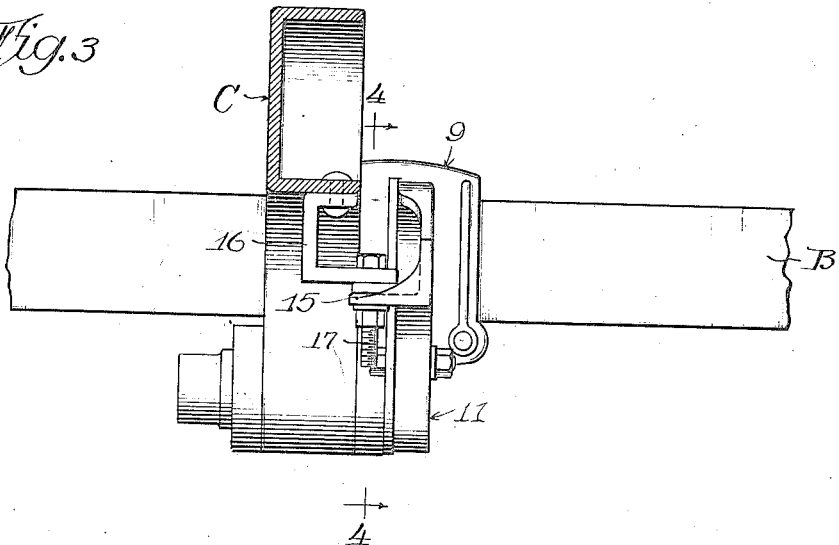
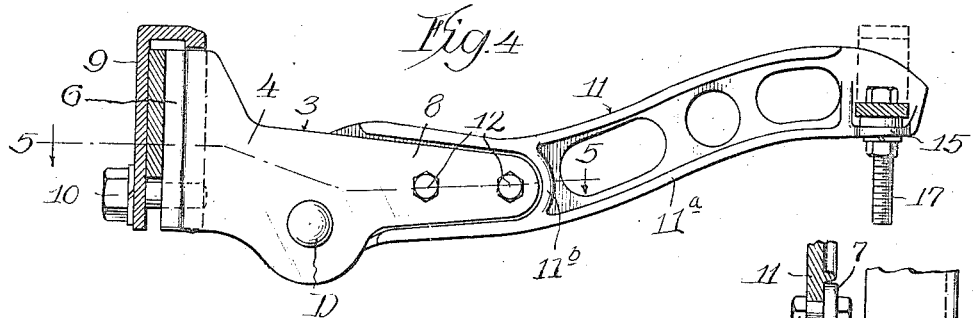
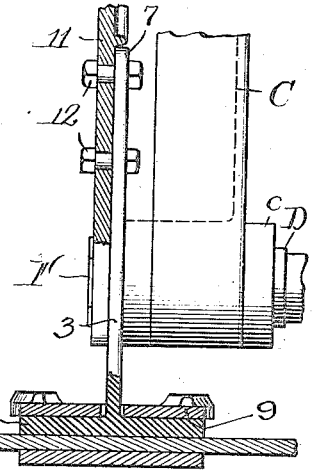
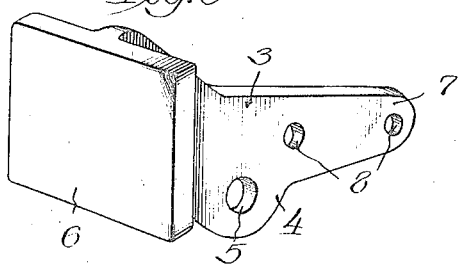
Inventor,
William J. Grotenhuis,

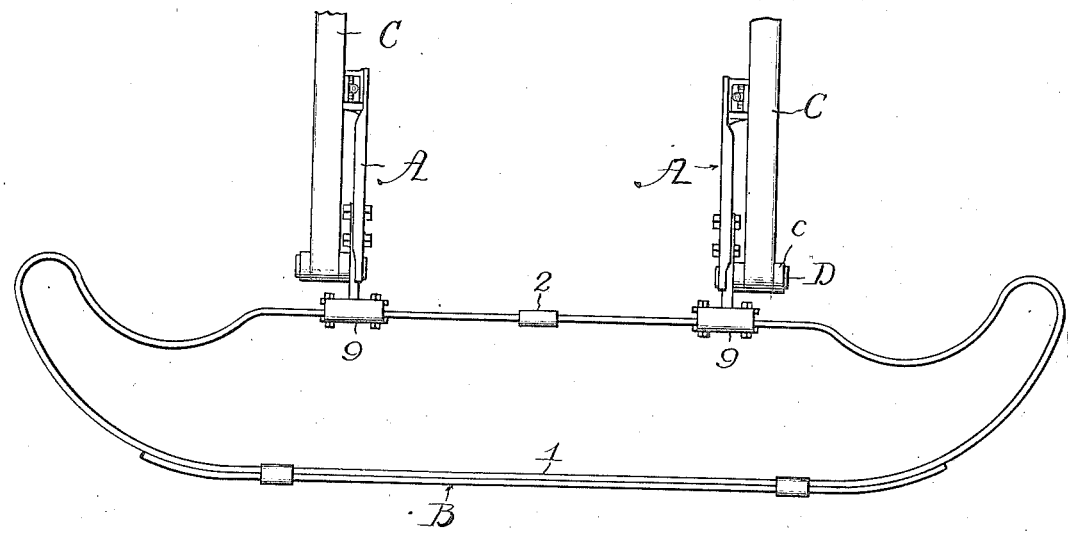
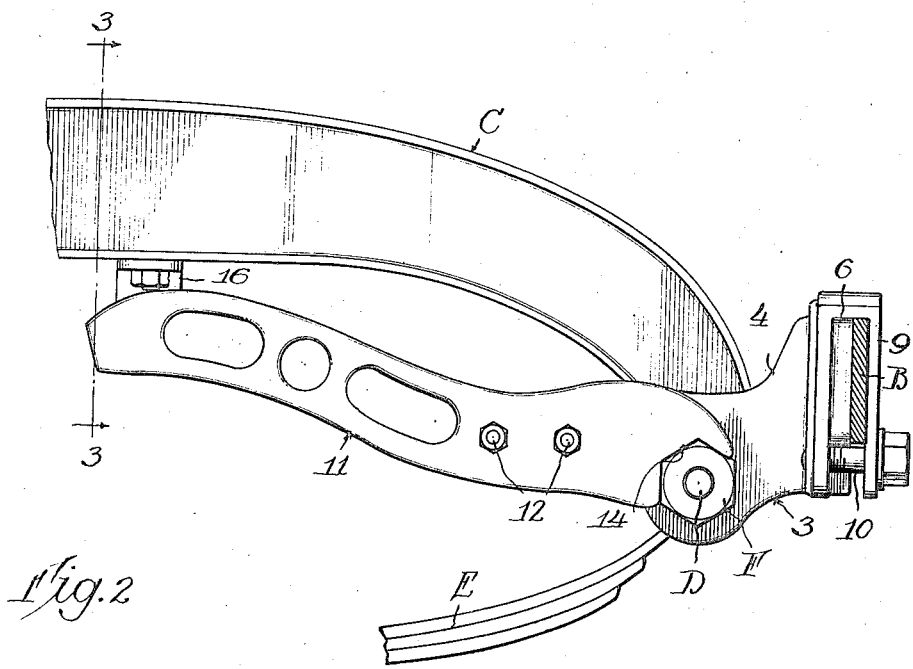

UNITED STATES PATENT OFFICE.

WILLIAM J. GROTENHUIS, OF CHICAGO, ILLINOIS, ASSIGNOR, BY MESNE ASSIGNMENTS, TO BIFLEX PRODUCTS COMPANY, A CORPORATION OF DELAWARE.

BUMPER BRACKET.

1,424,400.  Specification of Letters Patent.  Patented Aug. 1, 1922.

Application filed November 9, 1921. Serial No. 513,945.

*To all whom it may concern:*

Be it known that I, WILLIAM J. GROTENHUIS, a citizen of the United States, and a resident of Chicago, in the county of Cook and State of Illinois, have invented certain new and useful Improvements in Bumper Brackets, of which the following is a specification.

This invention relates to improvements in bumper attaching brackets for automobiles and more particularly to a method and means for securing such brackets to the side frame members of an automobile.

Among the objects of the invention is to provide a strong and rigid construction for a bracket, capable of being readily applied to an automobile with the expenditure of the least amount of labor and, further, to provide a bracket adapted to be primarily supported by means of the spring bolt at one end of the automobile frame member, together with means for insuring the permanent connection between the bracket and the spring bolt whereby all danger of the spring bolt nut becoming loosened and the parts disconnected is prevented.

The preferred embodiment of the invention is fully illustrated in the accompanying drawing which may be briefly described as follows:

Fig. 1 is a top plan view of a bumper attached to the frame member of an automobile by the bracket embodying the invention, Fig. 2 is an enlarged view in side elevation of the forward end of a frame member with the bracket attached thereto and supporting a portion of the bumper, Fig. 3 is an enlarged view in vertical section taken on line 3—3 of Fig. 2 and showing the attaching bracket in rear elevation, Fig. 4 is another view in side elevation of the bracket as taken on line 4—4 of Fig. 3 and showing the inner face of the same, Fig. 5 is a view in horizontal section of the bumper supporting portion of the bracket as taken on line 5—5 of Fig. 4, and Fig. 6 is a perspective view of one part of the bracket to which the bumper is directly connected.

As disclosed in Fig. 1 the attaching brackets A—A support a bumper B immediately beyond the forward ends of the side frame members C—C of an automobile. The bumper B may be of any suitable type although preferably one made up of resilient bars, shaped to provide a forwardly disposed impact member 1 and a rearwardly spaced bar 2, extending between and beyond the ends of the side frame members C—C, and directly connected to the brackets A—A.

It is the customary practice in automobile construction to shape the forward ends of the side frame members C—C in the form of a downwardly curved and slightly tapering end portion, provided at its extremity with an enlarged head $c$ through which extends a spring bolt D, serving as a journal for the end of a semi-elliptic spring E. The spring bolt D is of the usual construction, having a removable nut F at one end, said bolt being inserted through the frame head $c$ and the nut F applied and tightened in the usual manner.

Describing, in a general way, the method of attachment of a bumper, a plate is clamped to one side of the frame member by means of the spring bolt, which extends through a hole in said plate, the spring bolt nut being removed to permit the application of the plate and again replaced and tightened. The bumper is secured at the forwardly projecting end of the plate, and to its rear end portion is secured additional members for holding said plate from rotation, and locking the nut of the spring bolt. These features are hereinafter more fully disclosed.

A plate or bracket member, such as described, is disclosed in the drawings as consisting of a plate 3 having a somewhat enlarged body portion 4 through which extends a hole 5. This body portion is adapted to abut flatwise against the end of the frame head $c$ on the inner side of each frame member C, as well as to extend forwardly, with a slight upward offset, terminating beyond the frame head in a vertically disposed integral plate 6 extending laterally on either side of the plate 3, and forming a forwardly facing bearing or abutment face, serving a purpose hereinafter to be pointed out. Rearwardly from the body portion 4 extends a relatively narrow arm 7 having formed therein a plurality of holes 8, preferably two in number, and arranged longitudinally of said arm.

As already explained a bracket member 3 of the conformation set forth, is adapted to be clamped to each of the frame members C—C in the manner described and in turn to support the bumper B as will now be pointed out.

The rear bar 2 of the bumper B is adapted to bear flatwise against the abutment face 6 of each bracket member 3 and to be securely clamped in this manner by means of clamping members 9—9 having the form of inverted U-shaped clamps of cast metal, so designed as to be inserted downwardly over each plate 6 and the abutting portion of the bar 2, the innermost web of each clamping member 9 being slotted vertically and intermediate its lateral edges, in order to permit said clamping members to straddle the abutting parts. The clamping members are secured in position by means of cap screws 10—10 which are inserted below the bumper bar 2, as clearly shown in Fig. 2.

Inasmuch as the bracket member 3, is hung upon the spring bolt D and therefore unstable, the complete attaching structure requires an addition which serves two functions, first to prevent the main bracket member 3 from rotation about the bolt D and secondly as a lock for the nut F to prevent the same from turning after the bracket has been applied. This member is in the form of a relatively long arm 11 extending rearwardly from the spring bolt D in a general direction parallel to the frame member C and slightly below the same. The forward end of the arm 11 overlaps the rearwardly extending arm 7 of the bracket member 3 and securedly fixed thereto by means of bolts 12—12 extend through the holes 8—8 in the bracket member 3 and registering holes formed in the arm 11—11.

Referring more in detail to the construction of the arm 11, the same is in the form of an elongated cast metal plate provided along its longitudinal edges and upon its inner face with reinforcing ribs 11ª, and merging with a curvilinear transverse rib 11ᵇ, conforming in shape and size to the arm 8 of the bracket member 3, to form a depression in which the said arm 8 snugly fits, as clearly shown in Fig. 4. At the forward extremity of the arm 11 is provided a notch 14, consisting of a plurality of angularly arranged straight faces which form in the effect a socket wrench adapted to engage at least three faces of the hexagonal nut F of the spring bolt D. At the rear end portion of the arm 11 and projecting laterally from the lower edge thereof is a lug 15 having a hole therethrough adapted for attachment with a connecting member, whereby the arm is connected with the frame member C. As a suitable connecting member the drawings disclose a U-shaped bracket 16, bolted or riveted to the under side of the frame member C, the lowermost horizontal arm thereof carrying a bolt 17 extending downwardly through and having adjustable connection with the lug 15 of the arm 11. Although it is understood that any convenient or suitable connection between the arm 11 and frame member C may be employed, it is preferred that such connection shall permit of a certain degree of vertical adjustment in order that the complete bracket may be rotated about the spring bolt D, in the event that a certain degree of adjustment is necessary in the attaching of the brackets or in the mounting of the bumper upon the brackets.

In applying a bumper and bracket to an automobile the bracket members 3—3 are first secured to the frame members in the manner already described, namely by removing the spring bolt nut F and placing the member 3 upon the bolt with the abutment face 6 facing in a forwardly direction. Ordinarily it is necessary to replace the standard spring bolt nut with a special nut of reduced thickness for the reason that a portion of the projecting end of the bolt would now be occupied by the bracket member 3 with the result that the standard nut could not be screwed on to the bolt to the same extent as before. Furthermore it may be desirable to employ a special nut of greater diameter than a standard nut, and one which fits exactly the wrench-like extremity of the arm 11. Having properly aligned the bracket member 3 and tightened the nut F, the arm 11 is then applied, first bolting the same to the rearwardly extending arm 8 of the bracket member 3, by means of the bolts 12—12. In connecting the parts together, however, it is necessary that the nut F be turned so that the wrench forming notch 14 will properly fit the nut F as shown in Fig. 2. Having connected the parts together the rear end of the arm 11 is then connected to the frame member C, the bolt 15, or other form of connecting member used, being drawn up tightly so as to eliminate all looseness between the parts. As thus assembled the now tightened parts form a rigid bracket, in readiness to receive the bumper B, which is clamped to the forward ends of the bracket members 3—3 in the manner already described.

Observing the location and method of mounting the arm 11, it may be readily likened to a socket wrench which is applied to the nut F, and fixed at an adjacent point to the bracket member 3, the part corresponding to a handle being extended rearwardly and adjustably anchored to the frame member. Thus a comparatively long lever arm is provided, which acts to oppose all forces tending to rotate the bumper and bracket about the spring bolt D, as well as serving as a locking means for the nut F, preventing the same from becoming loosened or unscrewed from the bolt D. In other words having mounted the arm 11 in place the complete installation at once becomes a permanent one.

Having described the device embodying the invention, I claim:—

1. An automobile bumper attaching bracket comprising a plate adapted to be mounted upon an automobile frame member by means of the spring bolt thereof, and an arm adapted to be connected with said plate and with said frame member, and provided with a locking notch engaging the nut of said bolt.

2. An automobile bumper attaching bracket comprising a plate adapted to be clamped to one side of an automobile frame member by means of the spring bolt thereof, and an arm having detachable connection with said plate, and said frame member, and provided with a wrench-like extremity adapted to fit the nut of said spring bolt.

3. An automobile bumper attaching bracket comprising a supporting plate adapted to be mounted on a bolt extending through the end of said frame member and the nut of said bolt tightened against said plate, and an arm bolted at one end to said plate and at its other end to said frame member, there being formed in said arm a wrench-shaped notch adapted to fit said nut.

4. An automobile bumper attaching bracket, comprising a bumper supporting member adapted to be applied to a spring bolt at the end of an automobile frame member by removing the nut at the end of said bolt, and passing the same through a hole in said member, and an arm adapted to be bolted to said member after said nut has been replaced and tightened, and having a wrench-like notch adapted to engage said nut, and means for connecting said arm to said frame member at a point distant from said bolt.

5. An automobile bumper attaching bracket, comprising a plate having an aperture adapted to engage a pivot bolt at the end of an automobile frame member by removing the nut thereof, and an arm adapted to be connected with said plate and with said frame member, rearwardly of said bolt, and provided with a locking notch adapted to engage the nut of said bolt after the same has been tightened.

6. An automobile bumper attaching bracket, comprising a plate adapted to be mounted at one end of an automobile frame member by means of a pivot bolt, and an arm adapted to be bolted to said plate after said plate has been mounted in position by the removal and replacement of a nut at one end of said bolt, said arm being provided at its adjacent end with a wrench-like extremity adapted to fit said nut and adapted for connection at its other end with said frame member.

7. An automobile bumper attaching bracket, comprising a supporting plate adapted to be mounted on a bolt extending through an end of said frame member, by inserting one end of said bolt through a hole in said plate and applying a nut to said bolt, adapted to bear against said plate, and an arm bolted at one end to said plate and at its other end to said frame member, there being provided in said arm a wrench-shaped notch adapted to fit said nut.

8. An automobile bumper attaching bracket comprising a supporting plate adapted to be applied to a spring bolt at the end of the automobile frame member by inserting an end of said bolt through a hole in said plate and applying a nut to the bolt in clamping engagement with said nut, and an arm adapted to be bolted to said member after said nut has been replaced and tightened, and having a wrench-shaped notch adapted to engage said nut, and means for connecting said arm to said frame member at a distance rearwardly of said bolt.

In witness whereof, I hereunto subscribe my name this 16th day of September, A. D. 1921.

WILLIAM J. GROTENHUIS.